Aug. 21, 1934.     J. H. JOHNSON     1,970,802
METHOD OF MAKING INFLATABLE RUBBER GOODS
Filed Oct. 8, 1930

Inventor.
John H. Johnson.

Patented Aug. 21, 1934

1,970,802

UNITED STATES PATENT OFFICE 1,970,802

METHOD OF MAKING INFLATABLE RUBBER GOODS

John H. Johnson, Toronto, Ontario, Canada

Application October 8, 1930, Serial No. 487,246

1 Claim. (Cl. 18—56)

The principal objects of this invention are to effect a material reduction in the cost of production of inflatable rubber goods and which will enable the manufacturer to produce such goods in great variety without expensive addition of moulds and manufacturing equipment.

A further and important object is to devise a structure of article which may be readily sealed without the use of metal or mechanical devices.

The principal features of the invention consist in the novel method of construction whereby flat sheets of rubber material are vulcanized together at selectable points leaving desired areas free to permit ready separation.

A further important feature consists in the novel construction of the inflating tubular extension and the means for sealing the same.

In the drawing, Figure 1 is a perspective view showing two sheets of rubber material being placed together in accordance with this invention for the purpose of forming an inflatable cushion.

Figure 1:
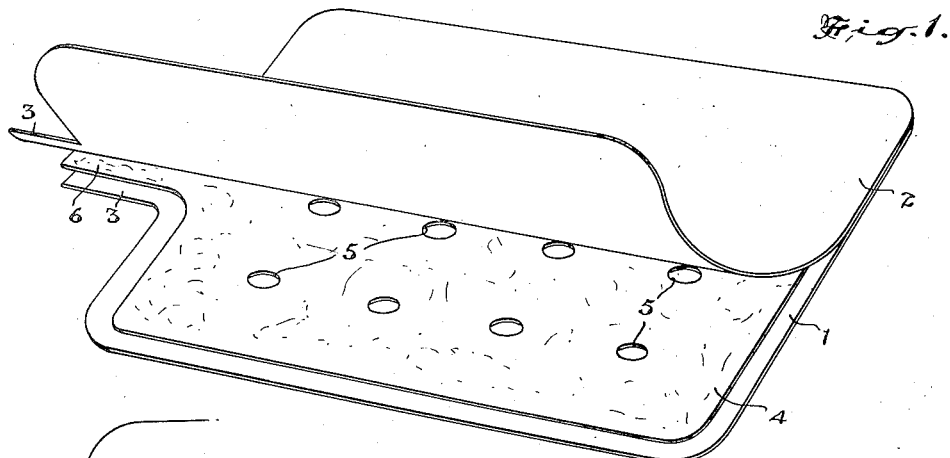

In carrying the present process of making hollow rubber goods into effect, flat sheets of rubber are cut to the desired outline of the article and as shown in Figure 1, an inflatable rubber cushion is formed of the rubber sheets 1 and 2, each of which is provided with an extension tongue portion 3.

One sheet of rubber is laid upon a flat surface and over it is placed a thin sheet of paper 4 preferably a thin tissue paper, the outer dimensions of which are slightly smaller than those of the rubber blank, so that when placed upon the rubber sheet there will be no exposed edge of the paper sheet all round with the exception of the tongue portion where the paper extends out to the end.

A plurality of holes 5 are cut in the paper sheet 4 and the other rubber sheet 2 is then placed over the paper sheet.

It will be readily understood that the two unvulcanized sheets will adhere around the raw edges and the openings formed by the holes 5 in the paper. When the sheets are thus placed together they are subjected to pressure to hold them securely in contact and a vulcanizing heat is applied. This may be done by placing the built-up members between flat steam-heated surfaces, or because of their flat nature they may be laid upon the surface of a steam-heated mandrel and held to the surface thereof under pressure by wrapping a fabric strip around the outward side.

The latter method is extremely flexible in that it permits articles of various sizes and shapes to be placed upon the mandrel and wrapped altogether by an overlapping fabric strip.

It will be noted that the tongue-shaped strip 6 of the paper sheet 4 extending beyond the end of the rubber tongue 3 prevents the adhesion of the rubber sheets together in such a manner as to completely seal the interior.

Figure 2:
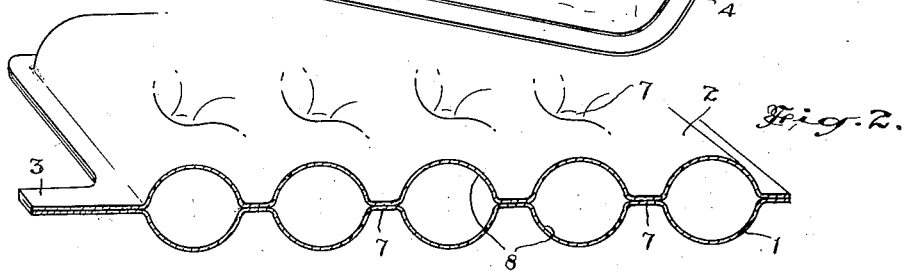
Figure 2 is a sectional perspective detail of a portion of a cushion formed in accordance with the method illustrated in Figure 1.

The placing of the paper sheet between the rubber strips prevents them from adhering so that after they have been subjected to a vulcanizing heat and air is forced in between the sheets, such sheets will stretch apart wherever the paper has held them from sealing contact, thus a cushion such as formed in the manner described in respect to Figure 1 will inflate in the manner shown in Figure 2, the spots 7 forming tufts between the stretched or inflated parts 8.

In order to provide means for sealing the inflated article a rubber patch 9 is placed upon the outer side over a piece of paper 10, the edges of the rubber patch overlapping the edges of the paper on all but one side. This patch is arranged in alignment with the inflating tube section formed by the lugs 3 and the paper placed over the sheet 2 extends beyond the rubber patch in a direction towards the inflater tube extension.

Figures 3, 4, 5, 6:
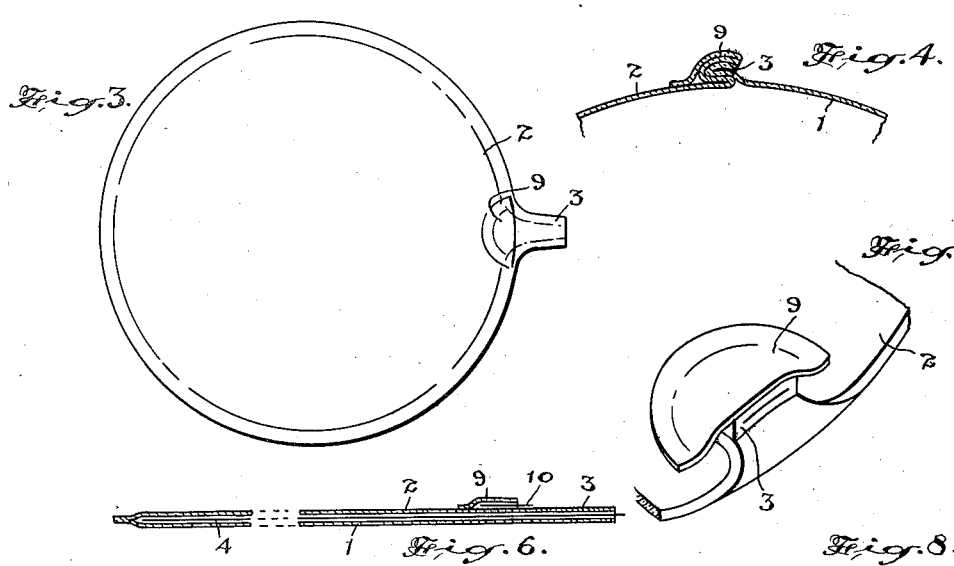
Figure 3 is a plan view of another form of article made according to the present process.
Figure 4 is an enlarged sectional detail taken transversely of the sealing pocket, showing the inflating tube folded thereinto.
Figure 5 is an enlarged perspective detail showing the sealing tube folded into its receiving pocket.
Figure 6 is a transverse sectional view showing the method of forming the pockets or unconnected recesses according to the present invention.

This patch is of course vulcanized in place in the same operation as the vulcanizing together of the main sheets and after the article has been vulcanized the open slit formed by the inserted paper forms a pocket and the inflating tube may be folded and tucked into the pocket and when so folded and tucked in it effectively holds the air placed in the inflated article from escape. This will be readily apparent on examining Figures 4 and 5 which show that the rubber inflating tube which is quite flat is doubled over in two places, thus forming a very effective seal to prevent the escape of air.

The flat rubber patch, which of course in the vulcanizing process flattens down over the surface of the article, holds the flat tube in position in such a way that it forms a minimum of a protrusion from the article. No metal is used and no matter how the article may be handled, even by children throwing it around, a person cannot be injured by being struck with a metal part such as a valve, and in the structure of a cushion there will be no metal part to form an objectionable obstruction.

Figures 7, 8:
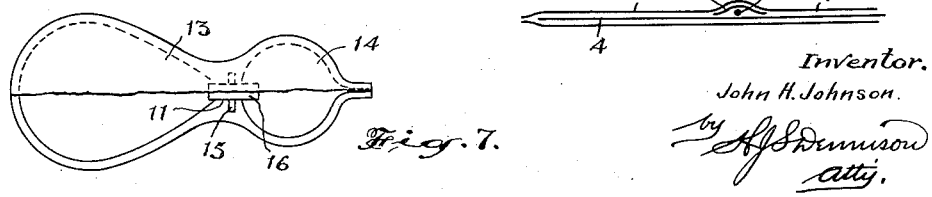
Figure 7 is a plan view of another form of application of the invention.
Figure 8 is a longitudinal sectional view illustrating a method of forming the device shown in Figure 7.

In the construction illustrated in Figures 7 and 8, the two sheets are placed together over a paper insert in the same manner as shown in Figure 1, but the paper insert is formed with a very narrow neck portion 11 which, when the device is completed, forms a very restricted passage between the two larger inflated areas 13 and 14.

In order to provide a novelty device, a thin strip of rubber 15 is laid across the narrow neck portion 11 of the paper and a thin paper strip 16, the same width as the narrow neck portion, is laid over the rubber strip 15. The top sheet is then placed thereover and the whole is vulcanized together.

The paper separating the portions 13 and 14 and the narrow neck on one side of the rubber strip allows the inflation and the thin strip 16 of paper separates the strip of rubber 15 from both side sheets so that an exchange of pressure or flow of air between either the portions 13 or 14 will cause the rubber strip 15 to vibrate and make a peculiar squeaking noise.

What I claim as my invention is:—

A method of making inflatable rubber goods, consisting in placing a flat paper sheet between two flat rubber sheets, said rubber sheets having registering tongue extensions from one side and the paper sheet having a tongue extension of narrower width than the aforesaid tongue and projecting beyond the ends of the rubber tongue portion, then placing on the outer side of one of said sheets a piece of paper, then placing over said outer piece of paper a rubber patch, leaving the paper projecting beyond the patch at one side thereof, then vulcanizing the whole to join the engaging rubber surfaces together.

JOHN H. JOHNSON.